(12) United States Patent
Ohno et al.

(10) Patent No.: US 10,310,214 B2
(45) Date of Patent: Jun. 4, 2019

(54) OPTICAL ELEMENT AND METHOD FOR MANUFACTURING THE SAME

(71) Applicant: Kabushiki Kaisha Toshiba, Minato-ku (JP)

(72) Inventors: Hiroshi Ohno, Yokohama (JP);
Takahiro Terada, Yokohama (JP);
Masayuki Tanaka, Yokohama (JP);
Hideshi Nakano, Yokosuka (JP);
Kotaro Kobayashi, Mie (JP);
Shanying Pan, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 264 days.

(21) Appl. No.: 15/125,053

(22) PCT Filed: Aug. 28, 2014

(86) PCT No.: PCT/JP2014/072657
§ 371 (c)(1),
(2) Date: Sep. 9, 2016

(87) PCT Pub. No.: WO2015/145804
PCT Pub. Date: Oct. 1, 2015

(65) Prior Publication Data
US 2017/0023766 A1    Jan. 26, 2017

(30) Foreign Application Priority Data

Mar. 25, 2014 (JP) .................................. 2014-062190

(51) Int. Cl.
*G02B 3/08* (2006.01)
*G02B 9/06* (2006.01)
(Continued)

(52) U.S. Cl.
CPC .............. *G02B 9/06* (2013.01); *B29C 64/135* (2017.08); *B29D 11/00269* (2013.01);
(Continued)

(58) Field of Classification Search
CPC ... G02B 9/06; G02B 9/12; G02B 3/00; G02B 3/08
See application file for complete search history.

(56) References Cited

U.S. PATENT DOCUMENTS

2006/0102914 A1    5/2006   Smits et al.
2011/0244187 A1*  10/2011   Rinko ................ B29D 11/0073
                                                            428/156
2013/0011603 A1    1/2013   Yasukochi

FOREIGN PATENT DOCUMENTS

CN    101160670 A    4/2008
CN    102544740 A    7/2012
(Continued)

OTHER PUBLICATIONS

International Search Report dated Dec. 2, 2014 in PCT/JP2014/072657 (with English language translation).
(Continued)

*Primary Examiner* — Joseph P Martinez
(74) *Attorney, Agent, or Firm* — Oblon, McClelland, Maier & Neustadt, L.L.P.

(57) ABSTRACT

An optical element includes first and second optical portions, and a first connection region. The first optical portion has first and second surfaces opposed each other. The first optical portion is light transmissive. The second optical portion has a third surface opposing the first surface and separated from the first surface, and a fourth surface on an opposite side to the third surface. The second optical portion is light transmissive. The first connection region connects at least a portion of an end of the first optical portion and at least a portion of an end of the second optical portion, and
(Continued)

provides a seamless connection to the first and second optical portions. The first connection region is light transmissive. At least one of the first or second surfaces includes a portion slanted to a plane perpendicular to a first direction from the second optical portion toward the first optical portion.

18 Claims, 6 Drawing Sheets

(51) Int. Cl.
    *G02B 3/00*     (2006.01)
    *B29D 11/00*     (2006.01)
    *B33Y 80/00*     (2015.01)
    *G02B 9/12*     (2006.01)
    *B29C 64/135*     (2017.01)

(52) U.S. Cl.
    CPC ................ *B33Y 80/00* (2014.12); *G02B 3/00* (2013.01); *G02B 3/08* (2013.01); *G02B 9/12* (2013.01)

(56) References Cited

FOREIGN PATENT DOCUMENTS

| | | | | |
|---|---|---|---|---|
| JP | 57-178201 U | | 11/1982 | |
| JP | 62-153908 | * | 7/1987 | ............... G02B 7/02 |
| JP | 62-153908 A | | 7/1987 | |
| JP | 2005-141091 A | | 6/2005 | |
| JP | 2006-123302 A | | 5/2006 | |
| JP | 2013-18146 A | | 1/2013 | |
| JP | 2013-524288 A | | 6/2013 | |
| JP | 2013-254160 A | | 12/2013 | |
| TW | 200944839 A | | 1/2009 | |
| WO | WO 2011/127187 A1 | | 10/2011 | |

OTHER PUBLICATIONS

Combined Office Action and Search Report dated Jun. 18, 2015 in Taiwanese Patent Application No. 103130458 (with English language translation).
English translation of the Written Opinion dated Dec. 2, 2014 in PCT/JP2014/072657.

* cited by examiner

OPTICAL ELEMENT AND METHOD FOR MANUFACTURING THE SAME

TECHNICAL FIELD

The embodiment of the invention relates to an optical element and a method for manufacturing the same.

BACKGROUND ART

Optical elements (lens or the like) in which light transmissive material is processed into a lens shape are used for various devices. Novel optical elements are desired, which are more value-added than ever before and capable of reducing a load to a manufacturing process.

PRIOR ART DOCUMENT

Patent Document

[Patent Document 1] JP 2013-254160 A (Kokai)

SUMMARY OF INVENTION

Problem to be Solved by Invention

The embodiments of the invention provide a highly value-added optical element and a method for manufacturing the same.

Means for Solving Problem

According to one embodiment of the invention, an optical element includes a first optical portion, a second optical portion, and a first connection region. The first optical portion has a first surface and a second surface on an opposite side to the first surface. The first optical portion is light transmissive. The second optical portion has a third surface opposing the first surface and separated from the first surface, and a fourth surface on an opposite side to the third surface. The second optical portion is light transmissive. The first connection region connects at least a portion of an end of the first optical portion and at least a portion of an end of the second optical portion, and provides a seamless connection to the first optical portion and the second optical portion. The first connection region is light transmissive. At least one of the first surface or the second surface includes a portion slant to a plane perpendicular to a first direction from the second optical portion toward the first optical portion.

EMBODIMENTS OF INVENTION

Embodiments of the invention will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing there in above are marked with like reference numerals, and a detailed description is omitted as appropriate.

(First Embodiment)

FIG. 1A to FIG. 1D are schematic views illustrating an optical element according to a first embodiment.

Figures 1A, 1B:
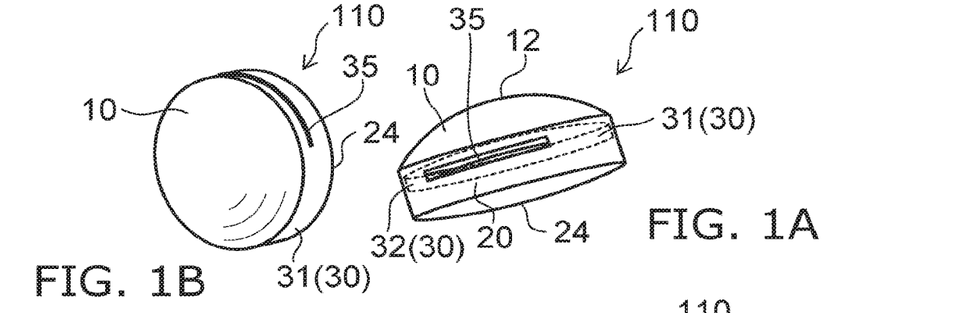
FIG. 1A to FIG. 1D are schematic views illustrating an optical element according to a first embodiment.
Figure 1C:
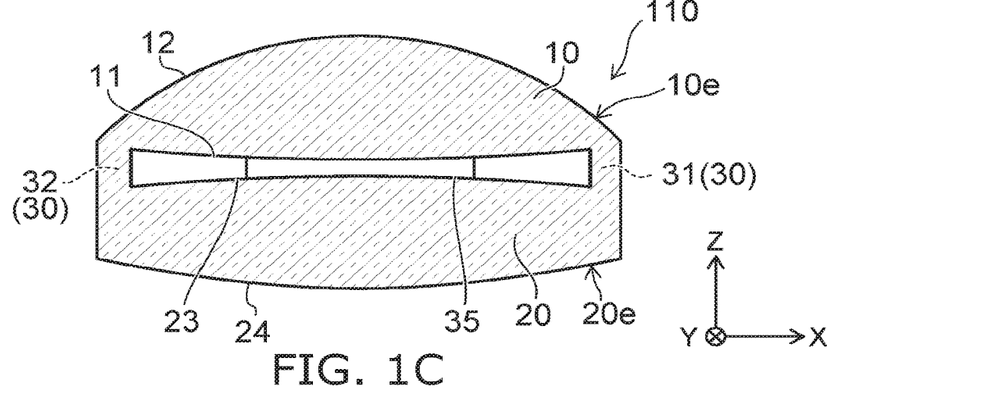
Figure 1D:
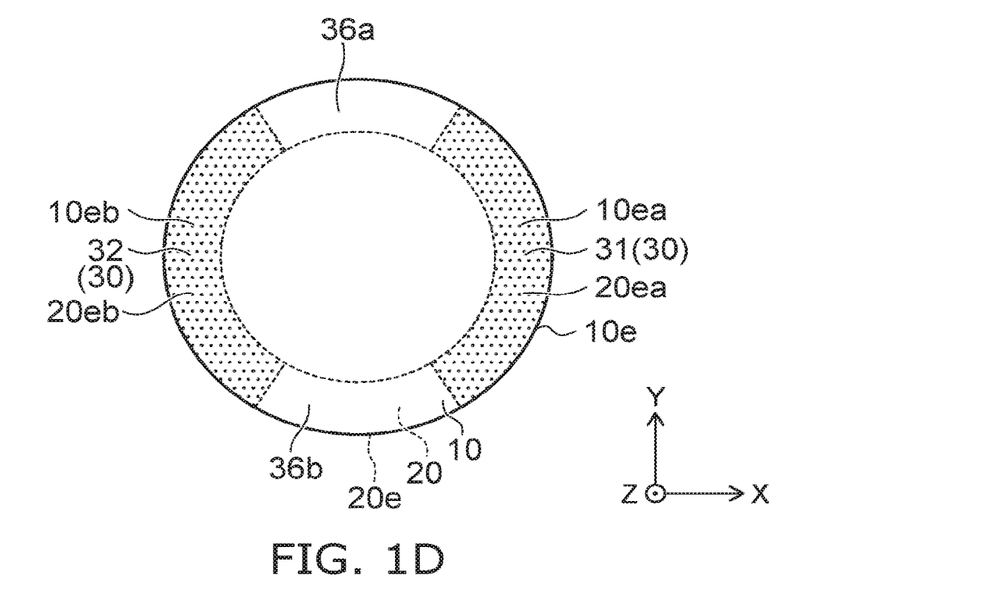

FIG. 1A and FIG. 1B are perspective views. FIG. 1C is a cross-sectional view. FIG. 1D is a plan view.

As shown in FIG. 1A to FIG. 1D, an optical element 110 according to the embodiment includes a first optical portion 10, a second optical portion 20, and a first connection region 30.

The first optical portion 10 has a first surface 11 and a second surface 12. The second surface 12 is a surface on an opposite side of the first surface 11. The first optical portion 10 is light transmissive.

The second optical portion 20 has a third surface 23 and a fourth surface 24. The third surface 23 is opposed to the first surface 11 and separated from the first surface 11. The fourth surface 24 is a surface on an opposite side of the third surface 23. The second optical portion 20 is light transmissive.

A direction from the second optical portion 20 toward the first optical portion 10 is taken as a first direction (Z-axis direction). One direction perpendicular to the Z-axis direction is taken as an X-axis direction. A direction perpendicular to the Z-axis direction and the X-axis direction is taken as a Y-axis direction.

The first connection region 30 connects at least a portion of an end 10e of the first optical portion 10 and at least a portion of an end 20e of the second optical portion 20. The first connection region 30 provides a seamless connection to the first optical portion 10 and the second optical portion 20. For example, there is substantially no interface reflecting a light between the first optical portion 10 and the first connection region 30. For example, there is substantially no interface reflecting a light between the second optical portion 20 and the first connection region 30. The first connection region 30 is light transmissive.

The first optical portion 10, the second optical portion 20 and the first connection region 30 are, for example, transparent. These include, for example, an acrylic resin or a polycarbonate resin. These may include glass. In the embodiment, materials included in these resin are arbitrary.

In this example, the first connection region 30 connects a portion of the end 10e of the first optical portion and a portion of the end 20e of the second optical portion 20. In this example, the first connection region 30 connects these optical portions at two positions.

That is, the first connection region 30 includes a first connection portion 31 and a second connection portion 32. The second connection portion 32 is separated from the first connection portion 31. On the other hand, the end 10e of the first optical portion 10 includes a first portion 10ea and a second portion 10eb separated from the first portion 10ea. The end 20e of the second optical portion 20 includes a third portion 20ea and a fourth portion 20eb separated from the third portion 20ea. The first connection portion 31 connects the first portion 10ea and the third portion 20ea. The second connection portion 32 connects the second portion 10eb and the fourth portion 20eb.

A gap 35 formed between the first surface 11 and the third surface 23 is linked outside the optical element 110.

In this example, in a region between the first surface 11 and the third surface 23, the first connection portion 31 and the second connection portion 32 form multiple spaces. That is, the end 10e of the first optical portion 10 further includes multiple portions in addition to the first portion 10ea and the second portion 10eb. The end 20e of the second optical portion 20 further includes multiple portions in addition to the third portion 20ea and the fourth portion 20eb. These multiple portions of the end 10e of the first optical portion 10 and these multiple portions of the end 20e of the second optical portions 20 form multiple spaces (first space 36a and second space 36b). The gap 35 formed between the first surface 11 and the third surface 23 is linked outside the optical element 110 via these multiple spaces (first space 36a and second space 36b).

In the embodiment, at least one of the first surface 11 or the second surface 12 includes a slanted portion to an X-Y plane (a plane perpendicular to the first direction from the second optical portion 20 toward the first optical portion 10). In this example, the first surface 11 is substantially a plane. The second surface 12 is a convex surface (in this example, convex curved surface).

In the embodiment, at least one of the third surface 23 or the fourth surface 24 may include a slanted portion to the X-Y plane. In this example, the third surface 23 is a convex surface (in this example, convex curved surface). The fourth surface 24 is a convex surface (in this example, convex curved surface).

For example, the first optical portion 10 functions as a convex lens. The second optical portion 20 also functions as a convex lens.

In the embodiment, the first connection region 30 provides a seamless connection to the first optical portion 10 and the second optical portion 20. A material of the first connection region 30 is the same as a material of the first optical portion 10, and the same as a material of the second optical portion 20. The first optical portion 10, the second optical portion 20 and the first connection region 30 include, for example, a resin (for example, an acrylic resin or a polycarbonate resin). The first optical portion 10, the second optical portion 20 and the first connection region 30 may include glass. Glass is highly light transmissive, and more thermally conductive compared with a resin. The resin is light and low in cost.

A boundary (interface) is not formed substantially between the first connection region 30 and the first optical portion 10. A boundary (interface) is not formed substantially between the first connection region 30 and the second optical portion 20. The first connection region 30 is possible to obtain different optical characteristics from the first optical portion 10 and the second optical portion 20.

Figure 2:
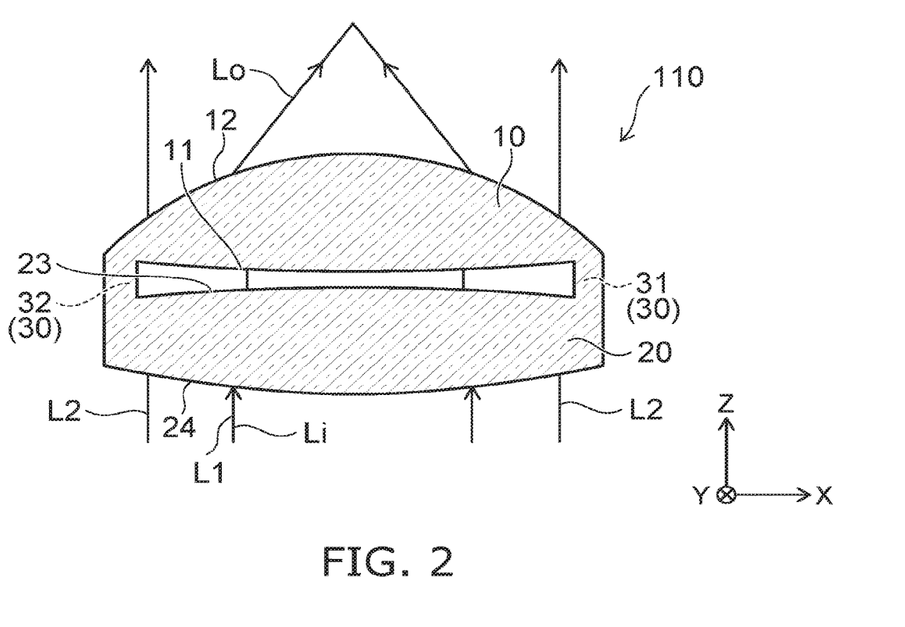
FIG. 2 is a schematic cross-sectional view illustrating the optical element according to the first embodiment.

FIG. 2 is a schematic cross-sectional view illustrating the optical element according to the first embodiment.

FIG. 2 illustrates characteristics of the optical element 110.

For example, an incident light Li is incident on the optical element 110. The incident light Li is incident on the first optical portion 10 and the second optical portion 20. The incident light Li passes through the first optical portion 10 and the second optical portion 20. An outgoing light Lo outgoes from the optical element 110. For example, when the incident light Li is parallel light, the outgoing light Lo is concentrated. That is, in this example, the first optical portion 10 and the second optical portion 20 function as a convex lens. That is, at least one of the first optical portion 10 or the second optical portion 20 causes the light to be concentrated. As described later, the first optical portion 10 and the second optical portion may function as a concave lens. The first optical portion 10 and the second optical portion may function so as to diffuse the light.

Respective optical axes of these optical portions coincide substantially. For example, the first optical portion 10 has a first optical axis, and the second optical portion 20 has a second axis parallel to the first axis.

That is, in the embodiment, a divergence angle of the outgoing light Lo which is incident on the first optical portion 10 and the second optical portion 20 in the first direction (Z-axis direction) and passes through the first optical portion 10 and the second optical portion 20 is different from a divergence angle of the incident light Li which is incident on the first optical portion 10 and the second optical portion 20.

On the other hand, the first connection region 30 can be provided with optical characteristics different from the characteristic of the first optical portion 10 and the second optical portion 20. For example, when an incident light on the first connection region 30 is a parallel light, a light outgoing from the first connection region 30 may be a parallel light. That is, a traveling direction of a first light L1 incident on the first optical portion 10 and the second optical portion 20 is different from a traveling direction of a second light L2 incident on the first connection region 30. For example, a first outgoing direction of the first light L1 incident on the first optical portion 10 in a first incident direction and outgoing from the second optical portion 20 is different from a second outgoing direction of the second light L2 incident on the first connection region 30 in the first incident direction and outgoing from the first connection region 30. For example, the first outgoing direction of the first light L1 incident on the second optical portion 20 in the first incident direction and outgoing from the first optical portion 10 is different from a second outgoing direction of the second light L2 incident on the first connection region 30 in the first incident direction and outgoing from the first connection region 30.

In the embodiment, a lens, for example, formed of the first optical portion 10 and the second optical portion 20, and the first connection region 30 having characteristic different from the lens are provided. Thereby, for example, the lens and the characteristics different from the lens can be used effectively. A highly value-added optical element can be provided.

For example, the optical element 110 is applied to an electronic instrument (camera or the like). The optical element 110 is mounted on a mounting board. In the mounting process, use of the incident light on the first connection region 30 allows mounting the optical element 110 to be easy. Accuracy of mounting can be improved. In the optical element 110 according to the embodiment, a load to a manufacturing process (mounting) can be reduced. In addition to this, the optical characteristics other than the lens, for example, formed of the first optical portion 10 and the second optical portion 20 allows other functions to be used. For example, multi focus (multiple condensing positions) is obtained.

At this time, in the embodiment, the first connection region 30 provides a seamless connection to the first optical portion 10 and the second optical portion 20. For example, in a reference example, an interface is formed between the first connection region 30 and the first optical portion 10, and an interface is formed between the first connection region 30 and the second optical portion 20. In this reference example, the incident light is reflected and absorbed at these interface, and light loss is generated by reflection loss and absorption loss. The light may outgo in an undesired direction. In contrast, in the embodiment, since the first connection region 30 provides a seamless connection to the first optical portion 10 and the second optical portion 20, the reflection and absorption like this are suppressed. Light is utilized effectively.

Furthermore, in the embodiment, the gap 35 is formed between the first surface 11 and the third surface 23. Heat dissipation is improved by this gap 35. This is because of heat emission to the outside by radiant heat of the first surface 11 and the third surface 23. Since the gap 35 is linked to the outside of the optical element 110, the heat dissipation is further improved. This is because of generation of air flow toward the outside from the gap 35 and heat emission to the outside. In the case where the gap is linked to the outside of the optical element 110 via the multiple spaces (first space 36a and second space 36b), one of multiple spaces serves as an inflow port of air, and other space serves as an outflow port. Thereby, a flow rate of air increases, and thus the heat dissipation is further improved.

In the embodiment, an adequate reflection effect is obtained at an interface to air by providing the gap 35. Thereby, desired optical characteristics are obtained.

In the optical element, the most intense reflection effect can be obtained at the interface to air. By providing the interface to air, the optical element having high ability to bend an optical path of light can be realized. Compared with the case where the interface to air is not used (the case of obtaining the reflection effect by the interfaced to other material), the other material is not necessary, and thus a material cost is low.

The optical element 110 can be light in a weight by providing the gap 35.

The material of the first connection region 30 is the same as the material of the first optical portion 10 and the material of the second optical portion 20, and thus a thermal expansion coefficient is easy to be the same. Thereby, deformation due to heat is easy to be suppressed. Temperature compensation is easy to be made and temperature control becomes easy.

In a reference example, multiple lenses are held by a holder or the like. The holder includes, for example, a metal. Since a metal blocks light, it is difficult to use the holder as a light transmissive optical element. Since the holder absorbs light, the absorption loss is generated. Furthermore, materials of the holder and the lens are different, and thus the temperature control is difficult.

The optical element 110 according to the embodiment is formed integrally. For example, it can be formed by AM (Additive Manufacturing) technology or the like described later. Thereby, for example, an assembly process combining the first optical portion 10 and the second optical portion 20 is unnecessary. In the first optical portion 10 and the second optical portion 20, adjustment of optical axis or the like is unnecessary. High accuracy optical characteristics can be obtained.

Figure 3A:
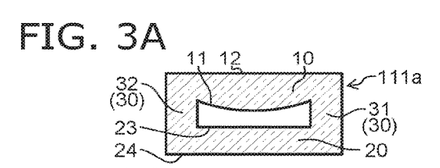
FIG. 3A to FIG. 3P are schematic cross-sectional views illustrating optical elements according to the first embodiment.
Figures 3B, 3D:
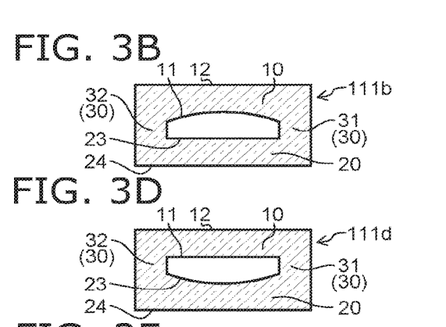
Figure 3C:
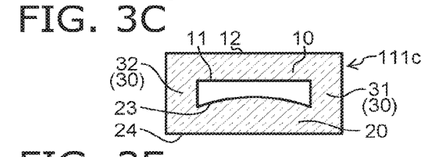
Figures 3E, 3G:
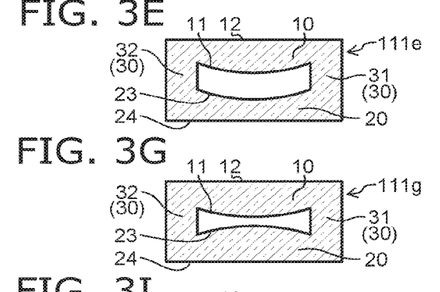
Figure 3F:
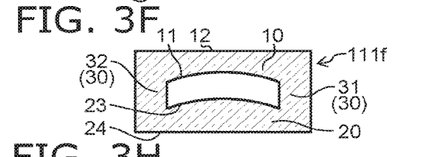
Figure 3H:
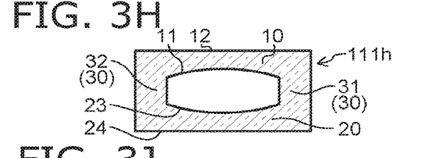
Figure 3I:
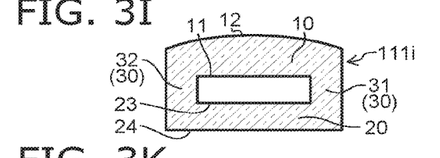
Figure 3J:
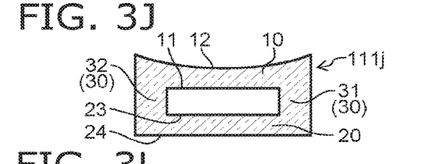
Figure 3K:
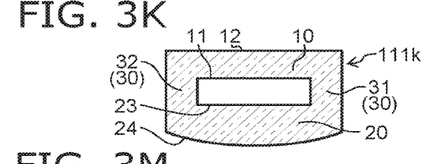
Figure 3L:
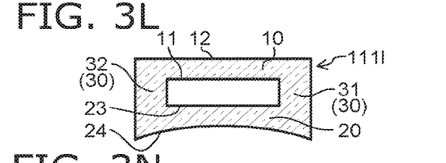
Figure 3M:
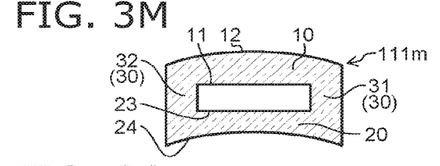
Figure 3N:
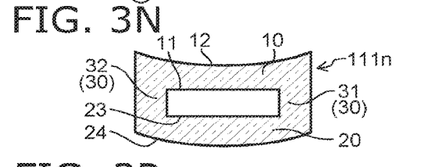
Figure 3O:
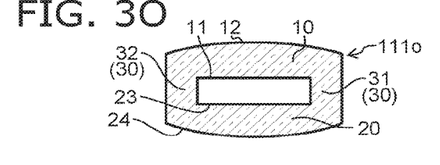
Figure 3P:
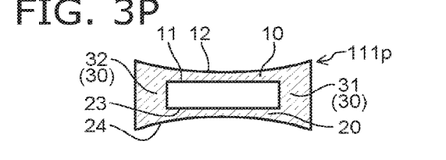

FIG. 3A to FIG. 3P are schematic cross-sectional views illustrating optical elements according to the first embodiment.

As shown in FIG. 3A, in an optical element 111a, the first surface 11 is convex. In this example, the second surface 12, the third surface 23 and the fourth surface 24 are substantially a plane. Like this example, the first surface 11 is non-parallel to the second surface 23.

As shown in FIG. 3B, in an optical element 111b, the first surface 11 is concave. In this example, the second surface 12, the third surface 23 and the fourth surface 24 are substantially a plane.

As shown in FIG. 3C, in an optical element 111c, the third surface 23 is convex. In this example, the first surface 11, the second surface 12 and the fourth surface 24 are substantially a plane.

As shown in FIG. 3D, in an optical element 111d, the third surface 23 is concave. In this example, the first surface 11, the second surface 12 and the fourth surface 24 are substantially a plane.

As shown in FIG. 3E, in an optical element 111e, the first surface 11 is convex. The third surface 23 is concave. In this example, the second surface 12 and the fourth surface 24 are substantially a plane.

As shown in FIG. 3F, in an optical element 111f, the first surface 11 is concave. The third surface 23 is convex. In this example, the second surface 12 and the fourth surface 24 are substantially a plane.

As shown in FIG. 3G, in an optical element 111g, the first surface 11 is convex. The third surface 23 is convex. In this example, the second surface 12 and the fourth surface 24 are substantially a plane.

As shown in FIG. 3H, in an optical element 111h, the first surface 11 is concave. The third surface 23 is concave. In this example, the second surface 12 and the fourth surface 24 are substantially a plane.

As shown in FIG. 3I, in an optical element 111i, the second surface 12 is convex. In this example, the first surface 11, the third surface 23 and the fourth surface 24 are substantially a plane.

As shown in FIG. 3J, in an optical element 111j, the second surface 12 is concave. In this example, the first surface 11, the third surface 23 and the fourth surface 24 are substantially a plane.

As shown in FIG. 3K, in an optical element 111k, the fourth surface 24 is convex. In this example, the first surface 11, the second surface 12 and the third surface 23 are substantially a plane.

As shown in FIG. 3L, in an optical element 111l, the fourth surface 24 is concave. In this example, the first surface 11, the second surface 12 and the third surface 23 are substantially a plane.

As shown in FIG. 3M, in an optical element 111m, the second surface 12 is convex. The fourth surface 24 is concave. In this example, the first surface 11 and the third surface 23 are substantially a plane.

As shown in FIG. 3N, in an optical element 111n, the second surface 12 is concave. The fourth surface 24 is convex. In this example, the first surface 11 and the third surface 23 are substantially a plane.

As shown in FIG. 3O, in an optical element 111o, the second surface 12 is convex. The fourth surface 24 is convex. In this example, the first surface 11 and the third surface 23 are substantially a plane.

As shown in FIG. 3P, in an optical element 111p, the second surface 12 is concave. The fourth surface 24 is concave. In this example, the first surface 11 and the third surface 23 are substantially a plane.

The first surface 11 is concave or convex. The second surface 12 is concave or convex. The third surface 23 is concave or convex. The fourth surface 24 is concave or convex. A curvature of each of the above surfaces may be the same as a curvature of other surface, and may be different. Various variations are possible.

Figure 4A:
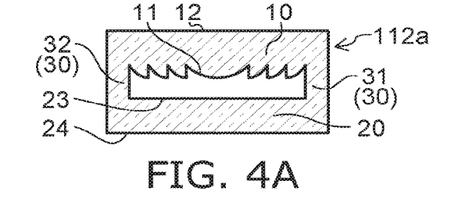
FIG. 4A and FIG. 4B are schematic cross-sectional views illustrating optical elements according to the first embodiment.
Figure 4B:
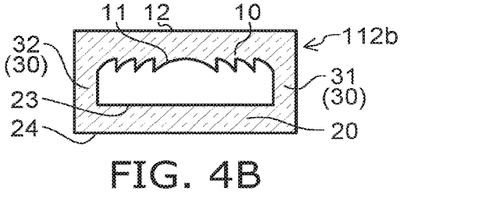

FIG. 4A and FIG. 4B are schematic cross-sectional views illustrating optical elements according to the first embodiment.

As shown in FIG. 4A, in an optical element 112a, the first surface 11 has a Fresnel lens surface. This Fresnel lens corresponds to a convex lens.

As shown in FIG. 4B, in an optical element 112b, the first surface has a concave Fresnel lens surface.

The Fresnel surface may be provided on the second surface 12. That is, at least one of the first surface 11 or the second surface 12 includes the Fresnel lens surface. In a similar way, at least one of the third surface 23 or the fourth surface 24 may include the Fresnel lens surface. A thin optical element can be realized by including the Fresnel lens surface.

FIG. 5A to FIG. 5D are schematic cross-sectional views illustrating optical elements according to the first embodiment.

Figure 5A:
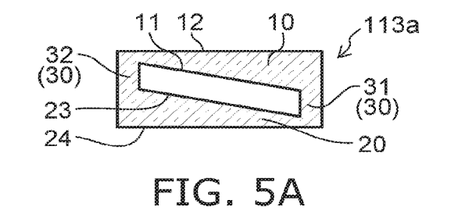
FIG. 5A to FIG. 5D are schematic cross-sectional views illustrating optical elements according to the first embodiment.

As shown in FIG. 5A, in an optical element 113a, the first surface 11 is substantially parallel to the third surface 23. The first surface 11 is slanted to the second surface 12. The third surface 23 is slanted to the fourth surface 24. A side surface of the first connection region 30 is substantially perpendicular to the second surface 12.

Figure 5B:
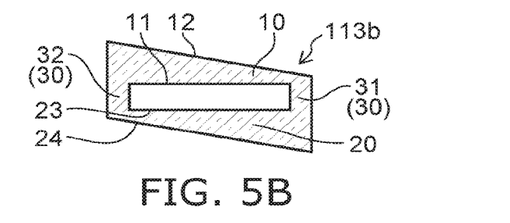

As shown in FIG. 5B, in an optical element 113b, the first surface 11 is substantially parallel to the third surface 23. The first surface 11 is slanted to the second surface 12. The third surface 24 is slanted to the fourth surface 24. A side surface of the first connection region 30 is substantially perpendicular to the first surface 11.

Figure 5C:
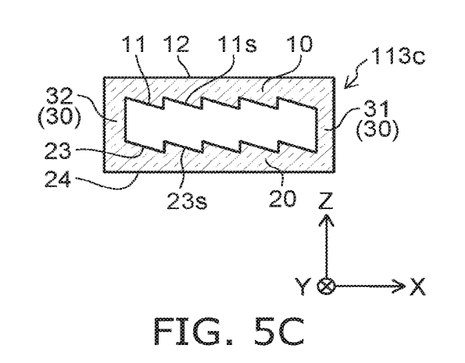

As shown in FIG. 5C, in an optical element 113c, multiple slant surfaces are provided on each of the first surface 11 and the third surface 23. Each of the first optical portion 10 and the second optical portion 20 functions as a prism portion. In this example, the slant surface of the first surface 11 is substantially parallel to parallel to the slant surface of the third surface 23.

The multiple slant surfaces may be provided on the second surface 12. The multiple slant surfaces may be provided on the fourth surface 24.

In this way, in the embodiment, at least one of the first surface 11 or the second surface 12 may include multiple slant surfaces slant to the first direction (Z-axis direction).

For example, the first surface 11 includes a first slant surface 11s slant to the first direction. The third surface 23 includes a second slant surface 23s slant to the first direction. The second slant surface 23s opposes the first slant surface 11s. These slant surfaces are substantially parallel one another. For example, the absolute value of an angle between a plane including the first slant surface 11s and a plane including the second slant surface 23s is not more than 1 degree.

By setting the absolute value of this angle not more than 1 degree, a shift from a desired angle in the final outgoing direction can be suppressed to be not more than 1 degree. For example, accuracy of 1 degree is generally sufficient for the optical element for illumination. That is, it may be said to be highly accurate if it is possible to control the optical pass under the accuracy of not more than 1 degree.

Figure 5D:
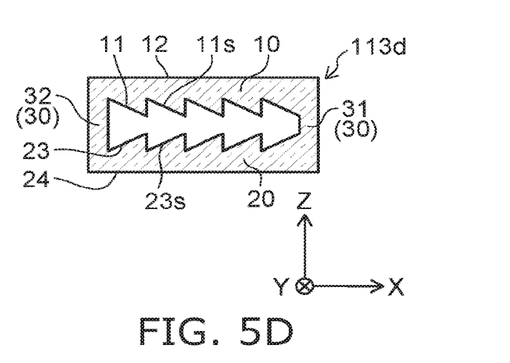

As shown in FIG. 5D, in an optical element 113d, multiple slant surfaces are provided on each of the first surface 11 and the third surface 23. In this example, the slant surface of the first surface is non-parallel to the slant surface of the third surface 23. If the slant surfaces are non-parallel, it becomes possible to change the outgoing direction with respect to the incident direction.

Figure 6A:
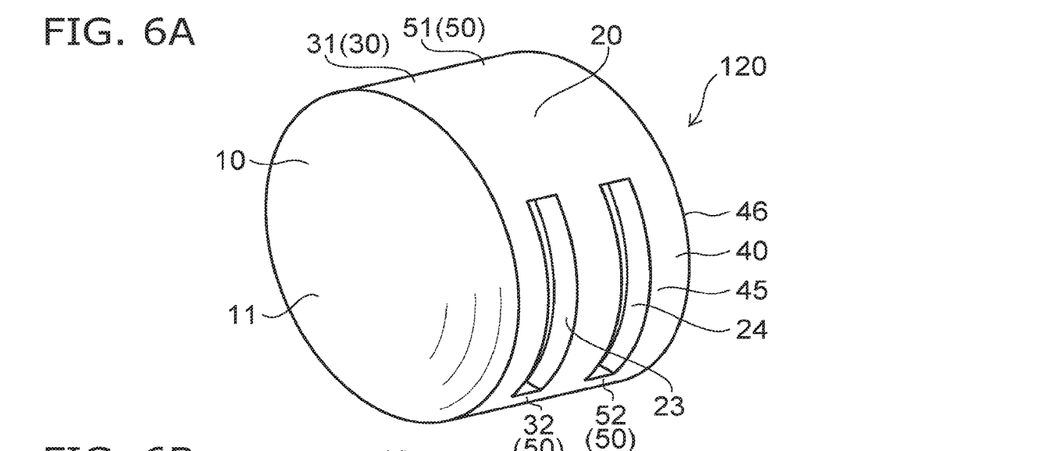
FIG. 6A to FIG. 6C are schematic views illustrating an optical element according to a second embodiment.
Figure 6B:
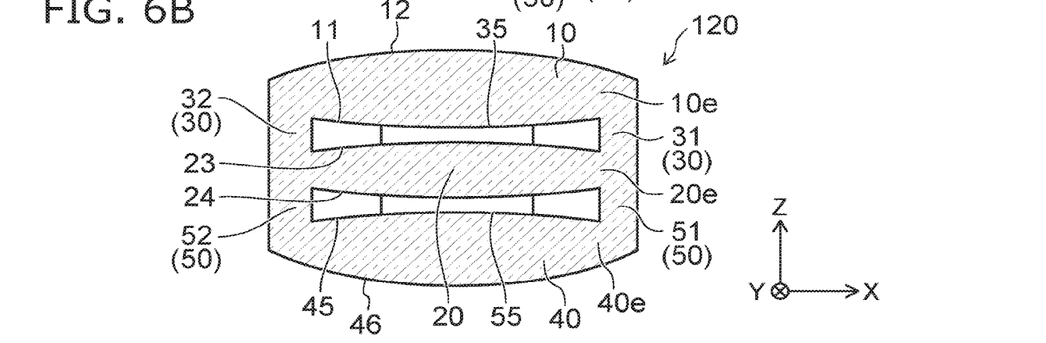
Figure 6C:
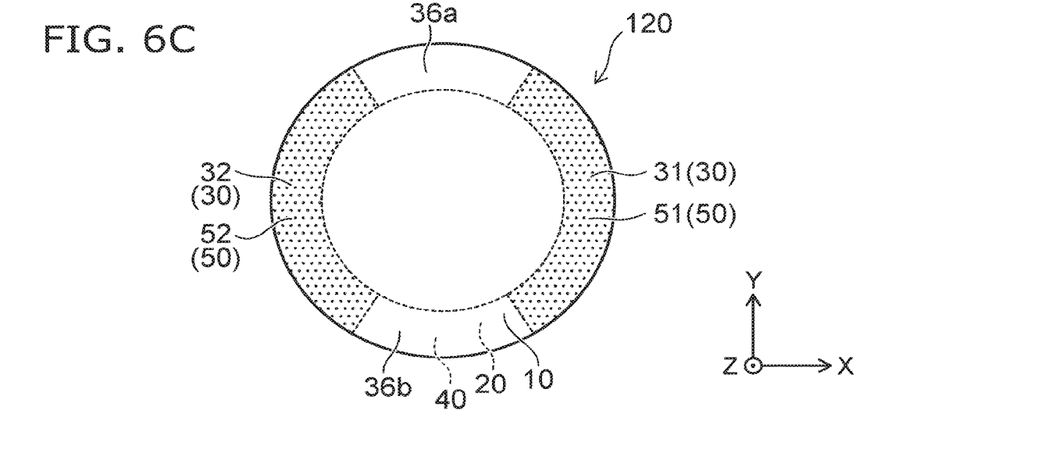

FIG. 6A to FIG. 6C are schematic views illustrating an optical element according to a second embodiment.

FIG. 6A is a perspective view. FIG. 6B is a cross-sectional view. FIG. 6C is a plan view.

As shown in FIG. 6A to FIG. 6C, an optical element 120 according to the embodiment further includes a third optical portion 40 and a second connection region 50 in addition to the first optical portion 10, the second optical portion 20 and the first connection region 30. The third optical portion 40 and the second connection region 50 are light transmissive. The third optical portion 40 and the second connection region 50 are, for example, transparent.

In this example, the second optical portion 20 is disposed between the first optical portion 10 and the third optical portion 40. The third optical portion 40 has a fifth surface 45 and a sixth surface 46. The fifth surface 45 opposes the fourth surface 24, and is a separated from the fourth surface 24. The sixth surface 46 is a surface on an opposite side to the fifth surface 45.

The second connection region 50 connects at least a portion of the end 20e of the second optical portion 20 and at least a portion of an end 40e of the third optical portion 40. The second connection region 50 provides a seamless connection to the second optical portion 20 and the third optical portion 40. For example, a material of the second connection region 50 is the same as a material of the second optical portion 20, and the same as a material of the third optical portion 40.

At least one of the fifth surface 45 or the sixth surface 46 includes a portion slant to the X-Y plane. In this example, the fifth surface 45 is convex, and the sixth surface 46 is convex.

In this way, in the embodiment, the number of optical portions provided is arbitrary, and the number of connection regions is also arbitrary.

Also in the optical element 120, a highly value-added optical element can be provided.

In this example, a gap 55 is formed between the fourth surface 24 and the fifth surface 45. That is, the second connection region 50 connects a portion of the end 20e of the second optical portion 20 and a portion of the end 40e of the third optical portion 40. The gap 55 formed between the fourth surface 24 and the fifth surface 45 is linked to the outside of the optical element 120. Also in this example, high heat dissipation is obtained.

(Third embodiment)

The third embodiment accords to a method for manufacturing an optical element. In this manufacturing method, for example, AM (Additive Manufacturing) technology is used.

Figure 7:
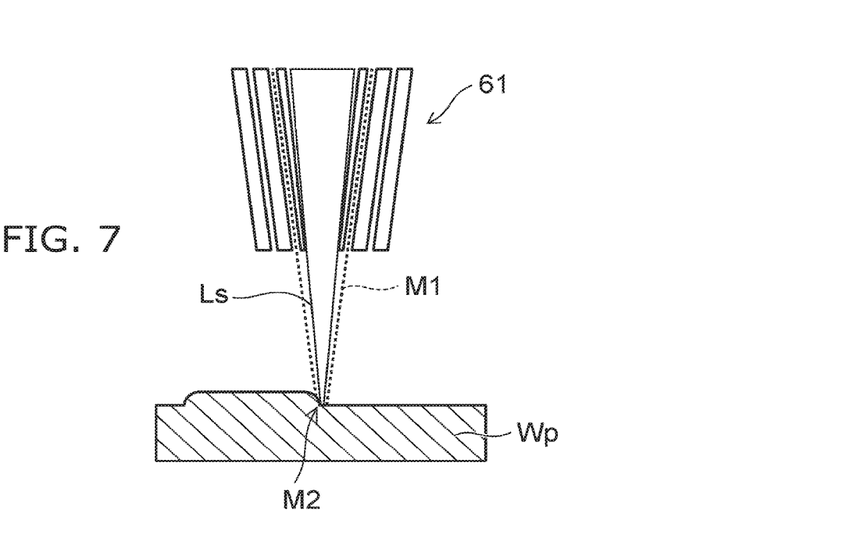
FIG. 7 is a schematic cross-sectional view illustrating a method for manufacturing the optical element according to the embodiment.

FIG. 7 is a schematic cross-sectional view illustrating a method for manufacturing the optical element according to the embodiment.

As shown in FIG. 7, a manufacturing device 310 includes a head 61 emitting an energy beam Ls and a raw material M1. While supplying the raw material M1 onto a workpiece Wp, the energy beam Ls is applied. The energy beam Ls is, for example, a laser light or an electron beam. The energy beam Ls is concentrated in the vicinity of the workpiece Wp. Thermal energy due to the energy beam Ls, for example, melts the raw material M1. A melting region M2 is formed. The melted raw material M1 is cooled and a portion of the optical element is formed. While changing a relative position between the workpiece Wp and the head 61, this operation is performed. Thereby, a desired shaped optical element is obtained. In this example, for example, the optical element is formed by a directional energy deposition method.

Figures 8A, 8B:
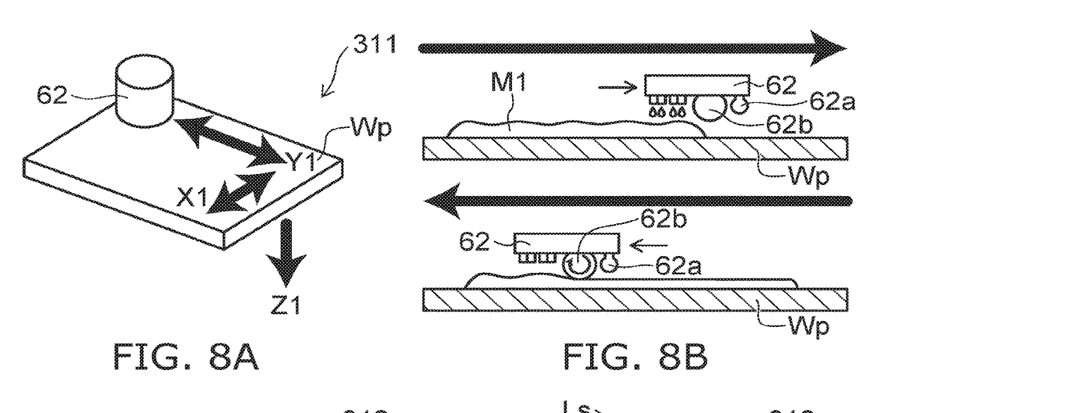
FIG. 8A and FIG. 8B are schematic views illustrating another method for manufacturing the optical element according to the embodiment.

FIG. 8A and FIG. 8B are schematic views illustrating another method for manufacturing the optical element according to the embodiment.

As shown in FIG. 8A, a manufacturing device 311 includes a head 62 emitting the raw material M1. The head 62 moves relatively to the workpiece Wp. In this example, the relative position of the head 62 and the workpiece Wp is changed in an X1 direction, a Y1 direction and a Z1 direction.

As shown in FIG. 8B, a liquid containing the raw material M1 outgoes from the head 62. This liquid attaches to the workpiece Wp. In this example, an energy beam irradiation part 62a is provided on the head 62. The energy beam (for example, ultraviolet ray) outgoes from the energy beam irradiation part 62a. Thereby, for example, the raw material M1 contained in the liquid is left on the workpiece Wp, and a portion serving as a portion of the optical element is formed. For example, a flattening part 62b (for example, roller or the like) may be provided on the head 62. The above portion formed from the raw material M1 is flattened. This operation is repeated while changing the relative position of the head 62 and the workpiece Wp. Thereby, a desired shape optical element is obtained.

Figure 9A:
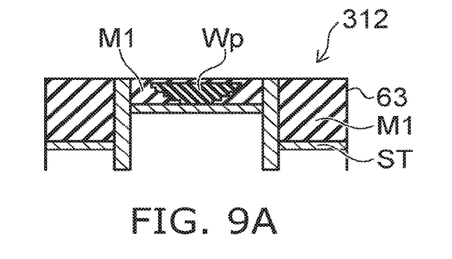
FIG. 9A and FIG. 9B are schematic views illustrating another method for manufacturing the optical element according to the embodiment.
Figure 9B:
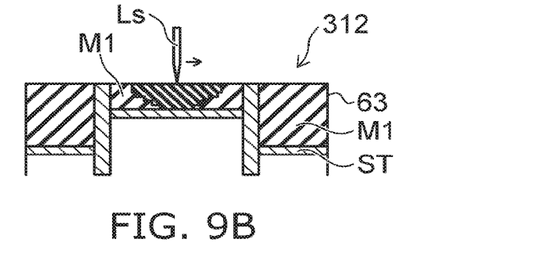

FIG. 9A and FIG. 9B are schematic views illustrating another method for manufacturing the optical element according to the embodiment.

As shown in FIG. 9A, in a manufacturing device 312, a stage ST is provided. A layer containing the raw material M1 is formed on the stage ST. For example, the raw material M1 is stored in a storing part 63. A desired thickness layer (layer containing the raw material M1) is formed on the stage ST by controlling a height of the stage ST.

As shown in FIG. 9B, the layer is irradiated with the energy beam Ls in a desired shape. By changing the relative position of the energy beam Ls and the stage ST, a portion serving as a portion of the optical element is formed at a desired position.

The manufacturing method according to the embodiment is the method for manufacturing the optical element, the optical element including: the first light transmissive optical portion 10 having the first surface 11 and the second surface 12 on a opposite side to the first surface 11; the light transmissive second optical portion 20 having the third surface 23 opposing the first surface 11 and separated from the first surface 11, the fourth surface 24 on an opposite side to the third surface 23; and the light transmissive first connection region 30 connecting at least a portion of the end 10e of the first optical portion 10 and at least a portion of the end 20e of the second optical portion 20, and providing a seamless connection to the first optical portion 10 and the second optical portion 20, at least one of the first surface 11 or the second surface 12 including a portion slant to a plane perpendicular to the first direction from the second optical portion 20 toward the first optical portion 10. In the manufacturing method, the energy beam is applied locally to a material serving as the first optical portion 10, the second optical portion 20 and the first connection region 30, and the first optical portion 10, the second optical portion 20 and the first connection region 30 are formed.

According to the embodiment, a highly value-added optical element and a method for manufacturing the same can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in optical elements such as optical portions, connection regions, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all optical elements and methods for manufacturing the same practicable by an appropriate design modification by one skilled in the art based on the optical elements and the method for manufacturing the same described above as embodiments of the invention also are within the scope of the invention to the extent that the spirit of the invention is included.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

The invention claimed is:

1. An optical element comprising:
   a first optical portion having a first surface and a second surface on an opposite side to the first surface, the first optical portion being light transmissive;
   a second optical portion having a third surface opposing the first surface and separated from the first surface, and a fourth surface on an opposite side to the third surface, the second optical portion being light transmissive; and
   a first connection region connecting at least a portion of an end of the first optical portion and at least a portion of an end of the second optical portion, and providing a seamless connection to the first optical portion and the second optical portion, the first connection region being light transmissive, wherein at least one of the first surface or the second surface includes a portion slant to a plane perpendicular to a first direction from the second optical portion toward the first optical portion, the first optical portion, the second optical portion, and the first connection region are in an integral configuration without an interface, and a space between the first surface and the third surface is continuous with an external region of the optical element.

2. The optical element according to claim 1, wherein at least one of the third surface or the fourth surface includes the portion slant to the plane.

3. The optical element according to claim 1, wherein a material of the first connection region is same as a material of the first optical portion and same as a material of the second optical portion.

4. The optical element according to claim 1, wherein the first surface is concave or convex.

5. The optical element according to claim 1, wherein the third surface is concave or convex.

6. The optical element according to claim 1, wherein a divergence angle of the outgoing light which is incident on the first optical portion and the second optical portion in the first direction and passes through the first optical portion and the second optical portion is different from a divergence angle of the incident light which is incident on the first optical portion and the second optical portion.

7. The optical element according to claim 1, wherein at least one of the first optical portion or the second optical portion concentrates a light.

8. The optical element according to claim 1, wherein a first outgoing direction of a first light incident on the first optical portion in a first incident direction and outgoing from the second optical portion is different from a second outgoing direction of a second light incident on the first connection region in the first incident direction and outgoing from the first connection region.

9. The optical element according to claim 1, wherein the first optical portion, the second optical portion, and the first connection region include a resin.

10. The optical element according to claim 1, wherein the first optical portion, the second optical portion, and the first connection region include glass.

11. The optical element according to claim 1, wherein
the first connection region connects a portion of the end of the first optical portion and a portion of the end of the second optical portion, and
a gap formed between the first surface and the third surface is linked to outside of the optical element.

12. The optical element according to claim 1, wherein
the end of the first optical portion includes a first portion and a second portion separated from the first portion,
the end of the second optical portion includes a third portion and a fourth portion separated from the third portion,
the first connection region includes a first connection portion and a second connection portion separated from the first connection region,
the first connection portion connects the first portion and the third portion, and
the second connection portion connects the second portion and the fourth portion.

13. The optical element according to claim 12, wherein
the end of the first optical portion further includes multiple portions,
the end of the second optical portion further includes multiple portions, and
a gap formed between the first surface and the third surface is linked to outside of the optical element via multiple spaces formed of the multiple portions of the end of the first optical portion and the multiple portions of the end of the second optical portion.

14. The optical element according to claim 1, wherein
the first optical portion has a first optical axis, and
the second optical portion has a second optical axis parallel to the first optical axis.

15. The optical element according to claim 1, wherein at least one of the first surface or the second surface includes a Fresnel lens.

16. The optical element according to claim 1, wherein at least one of the first surface or the second surface includes multiple slant surfaces slant to the first direction.

17. The optical element according to claim 1, wherein the first surface is non-parallel to the third surface.

18. A method for manufacturing an optical element, the optical element including:
a first optical portion having a first surface and a second surface on an opposite side to the first surface, the first optical portion being light transmissive;
a second optical portion having a third surface opposing the first surface and separated from the first surface, and a fourth surface on an opposite side to the third surface, the second optical portion being light transmissive; and
a first connection region connecting at least a portion of an end of the first optical portion and at least a portion of an end of the second optical portion, and providing a seamless connection to the first optical portion and the second optical portion, the first connection region being light transmissive,
at least one of the first surface or the second surface including a portion slant to a plane perpendicular to a first direction from the second optical portion toward the first optical portion,
the first optical portion, the second optical portion, and the first connection region being in an integral configuration without an interface, and
a space between the first surface and the third surface being continuous with an external region of the optical element,
the method comprising:
applying an energy beam locally to a material serving as the first optical portion, the second optical portion and the first connection region, and
forming the first optical portion, the second optical portion, and the first connection region, wherein
forming the first optical portion, the second optical portion, and the first connection region includes causing at least one of the third surface or the fourth surface portion to slant with respect to the plane, and
a material of the first connection region is the same as a material of the first optical portion and the same as a material of the second optical portion.

* * * * *